United States Patent
Shimano et al.

(10) Patent No.: US 7,838,626 B2
(45) Date of Patent: Nov. 23, 2010

(54) POLYCARBOSILANE AND METHOD FOR PRODUCING SAME

(75) Inventors: Toshihisa Shimano, Hamana-gun (JP); Akinori Kitamura, Nagoya (JP); Akio Arano, Nagoya (JP); Hiroshi Suzuki, Nagoya (JP)

(73) Assignee: Toagosei Co., Ltd., Tokyo (JP)

( * ) Notice: Subject to any disclaimer, the term of this patent is extended or adjusted under 35 U.S.C. 154(b) by 276 days.

(21) Appl. No.: 11/817,179

(22) PCT Filed: Apr. 4, 2006

(86) PCT No.: PCT/JP2006/307134

§ 371 (c)(1),
(2), (4) Date: Oct. 7, 2008

(87) PCT Pub. No.: WO2006/109628

PCT Pub. Date: Oct. 19, 2006

(65) Prior Publication Data

US 2009/0163690 A1    Jun. 25, 2009

(30) Foreign Application Priority Data

Apr. 8, 2005  (JP) .............................. 2005-111695

(51) Int. Cl.
*C08G 77/00* (2006.01)
(52) U.S. Cl. ............................. 528/417; 528/10; 528/27
(58) Field of Classification Search ........................ None
See application file for complete search history.

(56) References Cited

U.S. PATENT DOCUMENTS

| | | | | |
|---|---|---|---|---|
| 4,267,211 A | * | 5/1981 | Yajima et al. | ................ 427/228 |
| 4,347,347 A | * | 8/1982 | Yajima et al. | ................. 528/30 |
| 4,737,552 A | * | 4/1988 | Baney et al. | ................. 525/478 |
| 4,767,876 A | * | 8/1988 | Seyferth et al. | ............. 556/410 |
| 6,121,342 A | * | 9/2000 | Suzuki et al. | ................ 522/148 |
| 6,660,230 B2 | * | 12/2003 | McGill et al. | ............ 422/82.13 |
| 2006/0063905 A1 | * | 3/2006 | Nakagawa et al. | ............ 528/12 |
| 2007/0055034 A1 | * | 3/2007 | Tajima et al. | ................. 528/12 |
| 2008/0033137 A1 | * | 2/2008 | Tauchi et al. | ................... 528/27 |
| 2008/0038527 A1 | * | 2/2008 | Akiyama et al. | ............ 428/219 |

FOREIGN PATENT DOCUMENTS

| | | |
|---|---|---|
| JP | 7-118007 | 5/1995 |
| JP | 9-13278 | 1/1997 |
| JP | 10-69819 | 3/1998 |
| JP | 2003-149822 | 5/2003 |
| JP | 2004-26895 | 1/2004 |

OTHER PUBLICATIONS

Moises M. Werlang, et al. "Silphenylene and Silphenylene-Siloxane Oligomers: Structure-Property Relationships", Journal of Inorganic and Organometallic Polymers, vol. 5, No. 1, 1995, pp. 75-85.

* cited by examiner

*Primary Examiner*—Randy Gulakowski
*Assistant Examiner*—Robert Loewe
(74) *Attorney, Agent, or Firm*—Oblon, Spivak, McClelland, Maier & Neustadt, L.L.P.

(57) ABSTRACT

The objective of the present invention is to provide a polycarbosilane having excellent solubility in common organic solvents and a method for production thereof. The polycarbosilane of the present invention is a polymer which is represented by the following general formula (1) and has an oxetanyl group in a side chain. $R^1$ is an alkyl group having no oxetanyl groups, aryl group having no oxetanyl groups, or an organic group having an oxetanyl group, $R^2$ is an organic group having an oxetanyl group, $R^3$ is an alkylene group, an arylene group, or an aralkylene group, and n is an integer of 5 to 200.

(1)

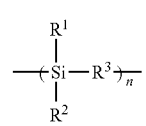

6 Claims, No Drawings

POLYCARBOSILANE AND METHOD FOR PRODUCING SAME

TECHNICAL FIELD

The present invention relates to a novel polycarbosilane and a method for producing the same. More specifically, it relates to a polycarbosilane having an oxetanyl group in a side chain, and a method for producing the same.

BACKGROUND ART

Compounds having an oxetanyl group are known for a polysilane having an oxetanyl group in a side chain (JP-A 2004-26895), a silsesquioxane having an oxetanyl group in a side chain (JP-A 2003-149822) and a polycarbosilane having an epoxy group or a nitrile group in a side chain (J. Inorg. Organomet. Polym., Vol. 5, No. 1, 1995 75-85).

However, a polycarbosilane having an oxetanyl group in a side chain is not known.

In JP-A 2004-26895, a method for introducing an oxetanyl group into a polysilane is disclosed by reacting a polysilane compound having a halogen group with a compound having an oxetane group and a hydroxyl group.

The polycarbosilane shows an excellent heat resistance and decomposition resistance, therefore it is used as a precursor for a ceramic material and a heat resistant resin material (refer to JP-A H07-118007, JP-A H10-069819 and JP-A H09-013278).

DISCLOSURE OF THE INVENTION

Problem to be Solved by the Invention

The conventional polycarbosilanes indicate inferior solubility in common organic solvents and sometimes limit to a specific solvent capable of dissolving it. Therefore, there has been a problem where use of the polycarbosilane is restricted.

An objective of the present invention is to provide a polycarbosilane having excellent solubility in common organic solvents and a method for producing the same.

Means to Solve the Problem

The present inventors had a keen examination for the purpose of achieving the above objective and synthesized newly a polycarbosilane having an oxetanyl group represented by the following general formula to find out that this compound led to an improved solubility in common organic solvents.

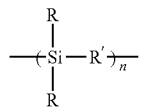

[In the formula, each R is an alkyl group having carbon number of 2 to 40 and having no oxetanyl group, an aryl group, or an alkyl group having carbon number of 2 to 40 and having an oxetanyl group (an ether bond may be included), at least one R among two Rs is an alkyl group having carbon number of 2 to 40 and having an oxetanyl group (an ether bond may be included), R' is an alkylene group, an arylene group and an aralkylene group all having carbon number of 1 to 20, and n is an integer of 5 to 200.]

The polycarbosilane of the present invention is a compound represented by the following general formula (1).

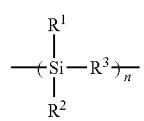

(1)

[In the formula, $R^1$ is an alkyl group having carbon number of 1 to 40 and having no oxetanyl group, an aryl group having carbon number of 6 to 40 and having no oxetanyl group, or an organic group having total carbon number of 5 to 40 and having an oxetanyl group, $R^2$ is an organic group having total carbon number of 5 to 40 and having an oxetanyl group, $R^3$ is an alkylene group having carbon number of 1 to 20, an arylene group or an aralkylene group, and n is an integer of 5 to 200.]

In the above formula (1), the organic groups $R^1$ and $R^2$ preferably have an ether bond.

Additionally, the method for producing the polycarbosilane of the present invention is characterized in comprising a process for hydrosilylation reaction of a compound represented by the following general formula (6), and a vinyloxetane compound represented by the following general formula (7).

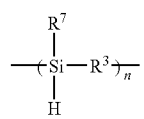

(6)

[In the formula, $R^3$ is an alkylene group having carbon number of 1 to 20, an arylene group or an aralkylene group, $R^7$ is hydrogen atom, an alkyl group having carbon number of 1 to 40 and having no oxetanyl group, or an aryl group having carbon number of 6 to 40 and having no oxetanyl group, and n is an integer of 5 to 200.]

$$CH_2=CH-R^8 \quad (7)$$

[In the formula, $R^8$ is an organic group having total carbon number of 3 to 38 and having an oxetanyl group.]

In the above formula (7), the organic group $R^8$ preferably has an ether bond.

Effect of the Invention

According to the novel polycarbosilane of the present invention, inclusion of an oxetanyl group that is a polar functional group leads to an improved affinity with a polar solvent. And the compound has good solubility in common solvents such as a ketone-based solvent including acetone, methylisobutylketone and methylamylketone, an ester-based solvent including ethyl acetate and butyl acetate, and a propyleneglycol-based solvent such as propyleneglycol dimethylether.

Therefore, the polycarbosilane of the present invention is useful as a modifier for resins and a surface-treatment agent for inorganic compounds.

The present invention can provide a heat resistant material capable of forming a variable shape easily without impairing characteristic of the polycarbosilane.

The polycarbosilane of the present invention can be safely and efficiently produced by using a comparably and readily available silicon compound as a starting material.

BEST MODE FOR CARRYING OUT THE INVENTION

The present invention is explained in detail, hereinafter.

1. Polycarbosilane

The polycarbosilane of the present invention is represented by the following general formula (1).

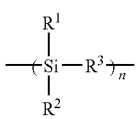
(1)

In the above general formula (1), $R^1$ is an alkyl group having carbon number of 1 to 40 and having no oxetanyl group, an aryl group having carbon number of 6 to 40 and having no oxetanyl group, or an organic group having total carbon number of 5 to 40 and having an oxetanyl group. In addition, $R^2$ is an organic group having total carbon number of 5 to 40 and having an oxetanyl group.

When the above $R^1$ is an alkyl group, the group may be linear type or branched type and preferable carbon number is 1 to 30, and more preferably 1 to 20. Specific examples of this alkyl group include methyl group, ethyl group, n-propyl group, isopropyl group, n-butyl group, isobutyl group, sec-butyl group, tert-butyl group, hexyl group, octyl group, decyl group, dodecyl group, hexadecanyl group and the like. Among these, methyl group is preferred.

Bound position of the oxetanyl group in the above organic group $R^2$ is not particularly limited and may be in the middle or at the terminal of the organic group. In addition, number of the oxetanyl group is not also particularly limited. Further, this organic group $R^2$ is generally a group containing primarily an alkylene group having carbon number of 3 to 37 or an arylene group having carbon number of 6 to 37 and may comprise other functional group and/or other bond. In the present invention, the above organic group $R^2$ preferably comprises an ether bond in addition to —O— bond contained in the oxetanyl group. The position and number thereof are not limited.

The above $R^1$ is also the same as the above $R^2$ in the case where the above $R^1$ is an organic group having total carbon number of 5 to 40 and having an oxetanyl group. In addition, when the above $R^1$ is an organic group having total carbon number of 5 to 40 and having an oxetanyl group, the above $R^1$ and $R^2$ each may be the same or different.

In the above general formula (1), $R^3$ is an alkylene group having carbon number of 1 to 20, an arylene group or an aralkylene group. Carbon numbers of the arylene group and the aralkylene group are usually 6 to 20 and 7 to 20, respectively. The above $R^3$ is preferably an arylene group.

Additionally, in the above general formula (1), both terminals are generally a phenyl group or a hydroxyl group.

Further, n in the above general formula (1) is an integer of 5 to 200, and is preferably 10 to 100. If n exceeds 200, solubility of the polycarbosilane in common solvents may be reduced. On the other hand, if n is less than 5, characteristics as a heat resistant material may not be sufficient.

The preferable polycarbosilane in the present invention is a compound represented by the following general formula (2).

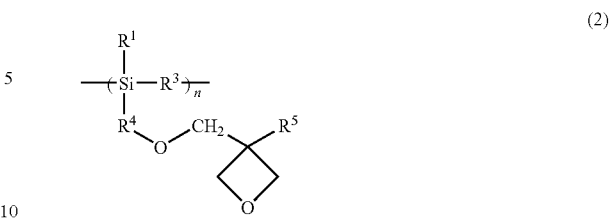

$R^1$ and $R^3$ in the above general formula (2) are same as $R^1$ and $R^3$ in the above general formula (1), respectively and descriptions thereof can be applied.

$R^4$ in the above general formula (2) is an alkylene group having carbon number of 2 to 20, an arylene group or an aralkylene group. When $R^4$ is an alkylene group, preferable carbon number is 2 to 14. This alkylene group may be linear type or have a side chain. Specific examples of this alkylene group include ethylene group, propylene group, butylene group and the like. In addition, when $R^4$ is an arylene group and an aralkylene group, preferable carbon numbers are 6 to 14 and 7 to 14, respectively. The above $R^4$ is preferably an alkylene group and is particularly propylene group.

$R^5$ in the above general formula (2) is hydrogen atom, an alkyl group having carbon number of 1 to 20, an aryl group having carbon number of 6 to 20, or an aralkyl group. When $R^5$ is an alkyl group, preferable carbon number is 1 to 12, and is more preferably 1 to 6. This alkyl group may be linear type or branched type. In addition, specific examples of this alkyl group include methyl group, ethyl group, propyl group, butyl group and the like. The above $R^5$ is preferably an alkyl group and is particularly ethyl group.

Further, n in the above general formula (2) is an integer of 5 to 200, and is preferably 10 to 100, as is the same as n in the above general formula (1).

Specific examples of the preferred polycarbosilane of the present invention are as follows.

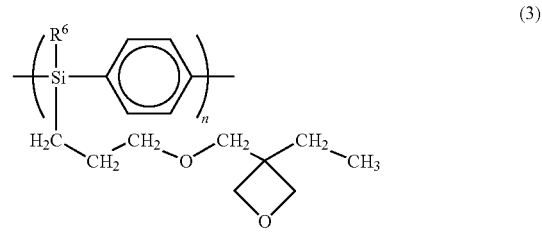

[In the formula, $R^6$ is an alkyl group having carbon number of 1 to 40 and having no oxetanyl group, or an aryl group having carbon number of 6 to 40 and having no oxetanyl group, and n is an integer of 5 to 200.]

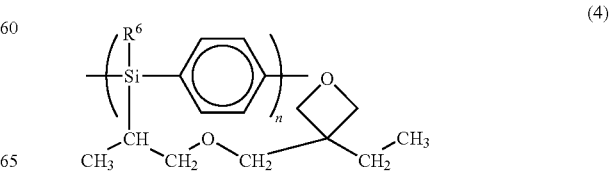

[In the formula, $R^6$ is an alkyl group having carbon number of 1 to 40 and having no oxetanyl group, or an aryl group having carbon number of 6 to 40 and having no oxetanyl group, and n is an integer of 5 to 200.]

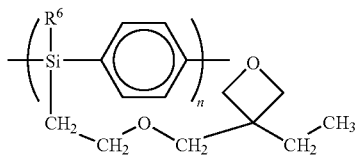
(5)

[In the formula, $R^6$ is an alkyl group having carbon number of 1 to 40 and having no oxetanyl group, or an aryl group having carbon number of 6 to 40 and having no oxetanyl group, and n is an integer of 5 to 200.]

Among these, polycarbosilanes represented by the general formulas (3) and (4) are particularly preferable.

2. Method for Production of Polycarbosilane

The production method for polycarbosilane of the present invention is characterized in comprising a process for hydrosilylation reaction of a compound represented by the following general formula (6), and a vinyloxetane compound represented by the following general formula (7).

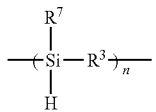
(6)

[In the formula, $R^3$ is an alkylene group having carbon number of 1 to 20, an arylene group or an aralkylene group, $R^7$ is hydrogen atom, an alkyl group having carbon number of 1 to 40 and having no oxetanyl group, or an aryl group having carbon number of 6 to 40 and having no oxetanyl group, and n is an integer of 5 to 200.]

$$CH_2=CH-R^8 \quad (7)$$

[In the formula, $R^8$ is an organic group having total carbon number of 3 to 38 and having an oxetanyl group.]

In the above general formula (6), $R^3$ is the same as $R^3$ in the above general formula (1) and description thereof can be applied. The preferable $R^3$ is an arylene group. In addition, $R^7$ is one selected from the group of hydrogen atom, an alkyl group and an aryl group that are having specific carbon number. When $R^7$ is an alkyl group or an aryl group, it is the same as $R^1$ in the above general formula (1) and description thereof can be applied. The preferable $R^7$ is methyl group from a viewpoint of easy availability as a starting material.

$R^8$ in the above general formula (7) is an organic group having total carbon number of 3 to 38 and having an oxetanyl group. However, the bound position of the oxetanyl group is not particularly limited and may be in the middle or at the terminal of the organic group. In addition, number of the oxetanyl group is not particularly limited. A compound that is easy to get as a starting material is a compound where the bound position of the oxetanyl group is in the middle of the organic group and the terminal is ethyl group.

In the present invention, the above organic group $R^8$ preferably comprises an ether bond in addition to —O— bond contained in the oxetanyl group. The position and number thereof are not limited.

In the case where the above organic $R^8$ has an ether bond, the structure of a vinyloxetane compound represented by the above general formula (7) is as follows.

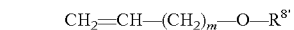

[In the formula, $R^{8'}$ is an organic group having an oxetanyl group and m is an integer of 0 to 12.]

Examples of the vinyloxetane compound represented by the above general formula (7) include 3-ethyl-3-allyloxymethyl oxetane, 3-methyl-3-allyloxymethyl oxetane, 3-allyloxymethyl oxetane, 3-ethyl-3-vinyloxymethyl oxetane, 3-methyl-3-vinyloxymethyl oxetane, 3-vinyloxymethyl oxetane and the like.

The hydrosilylation reaction between the compound represented by the above general formula (6), and the above vinyloxetane compound (7) is usually conducted in the presence of a catalyst in an organic solvent such as toluene and tetrahydrofuran.

Regarding the charging ratio of the compound represented by the above general formula (6) and the above vinyloxetane compound (7), the amount of SiH group in the compound represented by the above general formula (6) is preferably 0.1 to 2.0 equivalent and more preferably 1.0 to 2.0 equivalents based on 1 equivalent of carbon-carbon unsaturated group ($CH_2=CH-$) in the above vinyloxetane compound (7).

Examples of the above catalyst include an elemental metal from groups VIII-X containing Co, Ni, Ru, Rh, Pd, Ir, Pt and the like, an organic metal complex thereof, a metal salt thereof, a metal oxide thereof and the like. Among these, a platinum-vinylsiloxane complex such as platinum 1,3-divinyl-1,1,3,3-tetramethyldisiloxane complex; chloroplatinic acid hexahydrate ($H_2PtCl_6 \cdot 6H_2O$), cis-$PtCl_2(PhCN)_2$, platinum carbon and the like. It is noted Ph means phenyl group.

The amount of the above catalyst to be used is preferably 0.1 to 1,000 ppm based on the amount of the compound represented by the above general formula (6) to be used.

In addition, the above hydrosilylation reaction is usually conducted while heating. Reaction temperature depends generally on heating from outside and supplying rate of starting materials. When the temperature is held in the range from 30° C. to 120° C., the hydrosilylation reaction can be smoothly conducted. If this temperature is lower than 30° C., the hydrosilylation reaction does not proceed smoothly. If the temperature exceeds 120° C., controlling of the molecular weight of a polymer may be hard.

After the reaction, rinsing, layer-separating, desolventing and the like may be conducted according to known methods to collect the polycarbosilane of the present invention.

It is noted that the compound represented by the above general formula (6) can be easily obtained by Grignard reaction using a dihalogenosilane represented by the following general formula (8) and a dihalogenated compound represented by the following general formula (9).

(8)

[In the formula, $X^1$s are the same or different, each a halogen, $R^7$ is hydrogen atom, an alkyl group having carbon number of 1 to 40 and having no oxetanyl group, or an aryl group having carbon number of 6 to 40 and having no oxetanyl group.]

$$X^2—R^3—X^2 \quad (9)$$

[In the formula, $X^2$s are the same or different, each a halogen, $R^3$ is an alkylene group having carbon number of 1 to 20, an arylene group or an aralkylene group.]

In the dihalogenosilane represented by the above general formula (8), $X^1$ is preferably chlorine atom, bromine atom or iodine atom.

Additionally, in the dihalogenated compound represented by the above general formula (9), $X^2$ is preferably chlorine atom, bromine atom or iodine atom.

The dihalogenated compound represented by the above general formula (9) is preferably a dihalogenated aryl wherein $R^3$ is an arylene group, and paradibromobenzene is particularly preferable.

The charging ratio (mole ratio) of the compound (9) to the above compound (8) is preferably 0.5 to 1.5.

The production method of the polycarbosilane represented by the following formula (11) in which $R^6$ in the above general formula (3) is methyl group as the present polycarbosilane will be described below.

At first, a mixed solution of dichloromethylsilane and para dibromobenzene is added dropwise to an activated magnesium which is prepared by a known method to conduct Grignard reaction, thereby a polycarbosilane having Si—H group is obtained which is represented by the following formula (10).

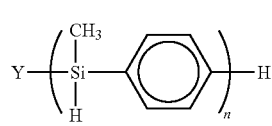

(10)

[In the formula, Y is a hydroxyl group or a phenyl group, and n is an integer of 5 to 200.]

The detailed procedure of the reaction for obtaining the polycarbosilane (10) is that a solvent and an activated agent are added to sufficiently dried magnesium and then a mixed solution of dichloromethylsilane and para dibromobenzene is added dropwise. The reaction temperature in this time is suitably selected from a range between ambient temperature and boiling point of the solvent. After adding all, restoring temperature, heating a little or refluxing at a temperature around boiling point is conducted. If the reaction temperature is too high, the resultant polycarbosilane (10) may be high molecular weight.

Examples of the above solvent include hydrocarbons such as n-pentane, n-hexane, cyclohexane, petroleum ether, toluene, xylene, gasoline and ligroin; ethers such as diethylether, diisopropylether and tetrahydrofuran.

In addition, examples of the above activating agent include 1,2-bromoethane, iodine and the like.

When the reaction is terminated, the solvent and the magnesium salt are removed and reprecipitation is conducted to isolate polycarbosilane.

After that, the obtained polycarbosilane (10) is subjected to hydrosilylation reaction with a vinyloxetane compound represented by the above general formula (7) in the presence of a platinum-based catalyst and a polycarbosilane represented by the following formula (11) can be produced.

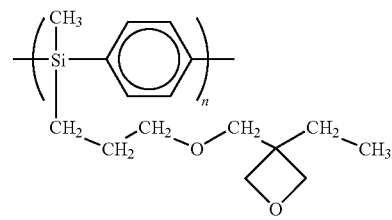

(11)

EXAMPLE

Hereinafter, the present invention is explained concretely with some Referential examples and Examples.

Referential Example 1

A reactor equipped with a stirrer, a thermometer and a condenser was subjected to an atmosphere of dried nitrogen and 75.1 gram (3.08 mol) of magnesium and 500 milliliter of tetrahydrofuran were charged into this reactor and stirred. After that, 1,2-dibromoethane was added to the reactor to make magnesium activated.

Then, a solution obtained by dissolving 323 gram (1.27 mol) of 1,4-dibromobenzene and 125 gram (1.09 mol) of dichloromethylsilane in 500 milliliter of tetrahydrofuran was fed in a dropping funnel and added dropwise to a reaction system.

When dropping was terminated, an oil bath was set to conduct a reflux while heating (67° C.) for three hours.

Subsequently, a reacted solution was transferred to separatory funnel. An organic extract was rinsed with water and anhydrous sodium sulfate was added to dehydrate. A solvent was removed under vacuum and then a residue was dissolved in a good solvent and a poor solvent was dropped to obtain a polycarbosilane having Si—H group represented by the following formula (12). The yield was 66.8%, average n in the formula (12) was 20, weight-average molecular weight Mw was 2,700 by gel permeation chromatography (GPC), and Mw/Mn was 3.58.

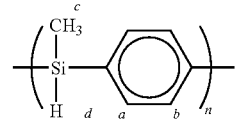

(12)

The chemical shift of the $^1$H NMR spectrum is as follows.
$^1$H NMR (270 MHz, solvent; CDCl$_3$)
δ7.57 (s, 4H) [a,b],
δ54.95 (q, J=3.8 Hz, 1H) [d],
δ50.64 (d, J=3.8 Hz, 3H) [c]

Referential Example 2

A reactor equipped with a stirrer, a thermometer and a condenser was subjected to an atmosphere of dried nitrogen and 45.5 gram (1.87 mol) of magnesium and 550 milliliter of tetrahydrofuran were charged into this reactor and stirred. After that, 1,2-dibromoethane was added to the reactor to make magnesium activated. Then, a solution obtained by dissolving 220.8 gram (937 mmol) of 1,4-dibromobenzene and 92.0 gram (800 mmol) of dichloromethylsilane in 250 milliliter of tetrahydrofuran was fed in a dropping funnel and added dropwise to a reaction system over four hours.

When dropping was terminated, an oil bath was set to conduct a reflux while heating (67° C.) for three hours.

Subsequently, a reacted solution was transferred to separatory funnel and an operation was conducted in the same manner as Referential example 1 to obtain 92.7 gram of a polycarbosilane having Si—H group represented by the above formula (12). The yield was 95%, average n in the formula (12) was 48, weight-average molecular weight Mw was 6,500, and Mw/Mn was 2.58.

Example 1

A reactor equipped with a stirrer, a thermometer and a condenser was subjected to an atmosphere of dried nitrogen and 19.0 gram (257 mmol) of polycarbosilane obtained in Referential example 1, 27.1 gram (173 mmol) of 3-ethyl-3-allyloxymethyloxetane and 400 milliliter of toluene were charged into this reactor and heated using an oil bath. When internal temperature was reached 80° C., 250 micro liter of 2.1% xylene solution of platinum 1,3-divinyl-1,1,3,3-tetramethyldisiloxane complex catalyst Pt[(C=C—Si(Me)$_2$)$_2$O] was added. And then reaction was conducted at 80° C. for three hours.

Subsequently, a reacted solution was transferred to separatory funnel. An organic extract was rinsed with water and anhydrous sodium sulfate was added to dehydrate. A solvent was removed under vacuum and then a residue was dissolved in a good solvent and a poor solvent was dropped to reprecipitate. Then, the solvent was removed under vacuum to obtain a polycarbosilane having an oxetanyl group represented by the following formula (13). The yield was 37.8%, weight-average molecular weight Mw was 6,100, and Mw/Mn was 1.28.

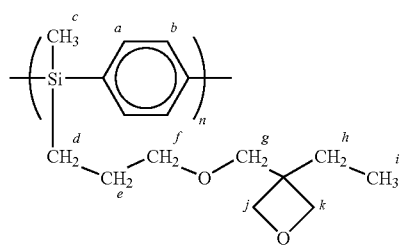

(13)

The chemical shift of the $^1$H NMR spectrum is as follows.
$^1$H NMR (270 MHz, solvent; CDCl$_3$)
δ7.49-7.57 (m, 4H) [a,b],
δ4.35-4.45 (m, 4H) [j,k],
δ3.41-3.49 (m, 4H) [g,f],
δ1.61-1.77 (m, 4H) [e,h],
δ1.04-1.10 (br, 2H) [d],
δ0.80-0.90 (m, 3H) [i]
δ0.55-0.60 (d, 3H) [c]

[Solubility Evaluation of Polycarbosilane]

Solubility in common solvents described below was examined and compared for the polycarbosilane having Si—H group represented by the above formula (12) according to Referential example 1 and the polycarbosilane having an oxetanyl group represented by the above formula (13) according to Example 1.

Each polycarbosilane was added separately to toluene, tetrahydrofuran (THF), propyleneglycol monomethylether acetate (PGMEA), propyleeglycol dimethylether (PGDM), ethyl lactate (EL), methylisobutylketone (MIBK) and methylamylketone (MAK) so as to prepare concentration of 5% by mass at 25° C., and solubility was observed to show the results in Table 1. When dissolution was observed, "O" was used. And when dissolution was not observed, "X" was used to indicate.

TABLE 1

|  | Toluene | THF | PGMEA | PGDM | EL | MIBK | MAK |
|---|---|---|---|---|---|---|---|
| Polycarbosilane by formula (12) | x | o | x | x | x | x | x |
| Polycarbosilane by formula (13) | o | o | o | o | o | o | o |

As clearly shown in Table 1, solubility of the polycarbosilane of the present invention represented by the above formula (13) was dramatically improved in comparison with the polycarbosilane having no oxetanyl group represented by the above formula (12).

INDUSTRIAL APPLICABILITY

The polycarbosilane of the present invention is useful as a modifier for resins, a surface-treatment agent for inorganic compounds, and a forming material for heat resistant materials and the like. In particular, it is useful for a heat resistant insulating material.

The invention claimed is:
1. A polycarbosilane characterized in that it is represented by the following general formula (1)

(1)

wherein R$^1$ is an alkyl group having carbon number of 1 to 40 and having no oxetanyl groups, an aryl group having carbon number of 6 to 40 and having no oxetanyl groups, or an organic group having total carbon number of 5 to 40 and having an oxetanyl group, R$^2$ is an organic group having total carbon number of 5 to 40 and having an oxetanyl group, R$^3$ is an alkylene group having carbon number of 1 to 20, an arylene group or an aralkylene group, and n is an integer of 5 to 200.

2. The polycarbosilane according to claim 1, wherein said organic group has an ether bond.

3. The polycarbosilane according to claim 2, represented by the following general formula (2)

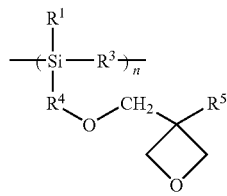
(2)

wherein $R^1$ is an alkyl group having carbon number of 1 to 40 and having no oxetanyl groups, an aryl group having carbon number of 6 to 40 and having no oxetanyl groups, or an organic group having total carbon number of 5 to 40 and having an oxetanyl group, $R^3$ is an alkylene group having carbon number of 1 to 20, an arylene group or an aralkylene group, $R^4$ is an alkylene group having carbon number of 2 to 20, an arylene group or an aralkylene group, $R^5$ is hydrogen atom, an alkyl group having carbon number of 1 to 20, an aryl group having carbon number of 6 to 20 or an aralkyl group, and n is an integer of 5 to 200.

4. The polycarbosilane according to claim 3, selected from the group consisting of compounds represented by the following general formulas (3), (4) and (5)

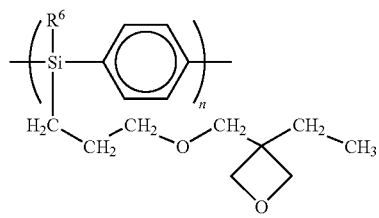
(3)

wherein $R^6$ is an alkyl group having carbon number of 1 to 40 and having no oxetanyl groups or an aryl group having carbon number of 6 to 40 and having no oxetanyl groups, and n is an integer of 5 to 200

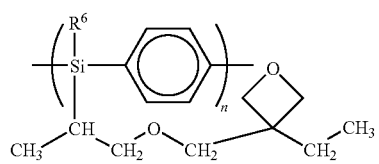
(4)

wherein $R^6$ is an alkyl group having carbon number of 1 to 40 and having no oxetanyl groups or an aryl group having carbon number of 6 to 40 and having no oxetanyl groups, and n is an integer of 5 to 200

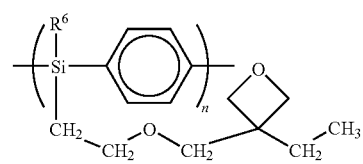
(5)

wherein $R^6$ is an alkyl group having carbon number of 1 to 40 and having no oxetanyl groups or an aryl group having carbon number of 6 to 40 and having no oxetanyl groups, and n is an integer of 5 to 200.

5. A method for producing the polycarbosilane described in claim 1, characterized in comprising a process for hydrosilylation reaction of a compound represented by the following general formula (6), and a vinyloxetane compound represented by the following general formula (7)

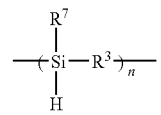
(6)

wherein $R^3$ is an alkylene group having carbon number of 1 to 20, an arylene group or an aralkylene group, $R^7$ is hydrogen atom, an alkyl group having carbon number of 1 to 40 and having no oxetanyl groups, or an aryl group having carbon number of 6 to 40 and having no oxetanyl groups, and n is an integer of 5 to 200

$$CH_2=CH-R^8 \quad (7)$$

wherein $R^8$ is an organic group having total carbon number of 3 to 38 and having an oxetanyl group.

6. The method for producing the polycarbosilane according to claim 5, wherein said organic group has an ether bond.

* * * * *